United States Patent [19]

Denzin

[11] 4,362,006

[45] Dec. 7, 1982

[54] HORIZONTALLY ROTATING BLADE-TYPE CONDITIONING DEVICE FOR SWATHERS

[76] Inventor: Warren Denzin, R.R. #1, Regina, Saskatchewan, Canada

[21] Appl. No.: 271,939

[22] Filed: Jun. 9, 1981

[51] Int. Cl.³ .................... A01D 43/00; A01D 57/20
[52] U.S. Cl. ........................................ 56/192; 56/238
[58] Field of Search ............... 56/192, 238, 13.7, 13.8, 56/121.46, 189, 181

[56] References Cited

U.S. PATENT DOCUMENTS

| | | | |
|---|---|---|---|
| 1,905,410 | 4/1933 | Innes | 56/238 |
| 1,915,615 | 6/1933 | Petsch | 56/192 |
| 1,944,750 | 1/1934 | Lindgren et al. | 56/238 |
| 1,954,629 | 4/1934 | Kettenbach et al. | 56/238 |
| 2,823,510 | 2/1958 | Grasswick | 56/192 |
| 2,850,861 | 9/1958 | Miller | 56/192 |
| 2,908,126 | 10/1959 | Dyrdahl | 56/192 |
| 3,731,468 | 5/1973 | Blumhardt | 56/192 |

*Primary Examiner*—Paul J. Hirsch
*Attorney, Agent, or Firm*—Stanley G. Ade

[57] ABSTRACT

A frame assembly mounted in the windrow discharge area on a swather or windrower on which a plurality of horizontal assemblies, are mounted thereto. On these assemblies are mounted fraying and cutting blades. These blades are operated at a required speed to fray and distort the tips of the stubble and/or cut and reduce the length of the straw of the standing stubble so as to ensure that the supportive strength of the straw is not exceeded by the weight of the swath or windrow placed upon it. This will eliminate any distortion or buckling of the remaining conditioned standing stubble straws. A windrow delivery plate is mounted on the swather frame assembly within the windrow discharge area. This plate assures delivery of the windrowed material onto the swath support fingers which effects a gradual release of the windrowed material onto the remaining standing frayed and conditioned stubble directly behind the frayer conditioners track of travel in the field. The conditioned stubble height is controlled by an axle type gauge wheel assembly.

30 Claims, 10 Drawing Figures

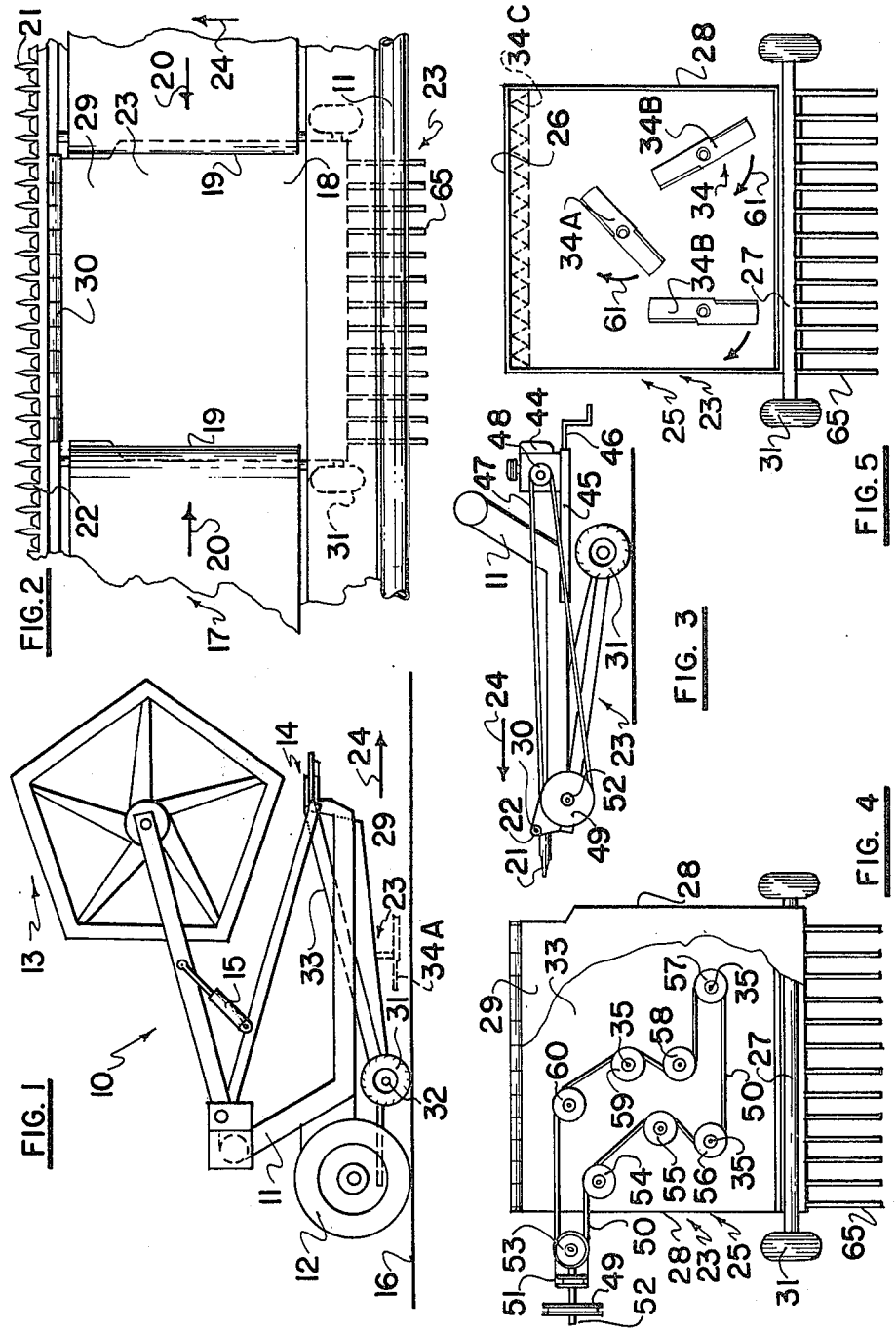

HORIZONTALLY ROTATING BLADE-TYPE CONDITIONING DEVICE FOR SWATHERS

BACKGROUND OF THE INVENTION

This invention relates to new and useful improvements in stubble conditioning devices particularly designed for use with farm implements such as swathers, windrowers or the like in which the grain is cut with a predetermined length of straw and then deposited in a swath behind the machine so that it can be air conditioned prior to threshing.

It will be appreciated that the straw length of growing grain varies depending upon the variety, the type of grain and weather conditions encountered during the growing season and such straw lengths may vary, for example, from relatively short up to a height of approximately 30 inches.

From a theoretical standpoint, it will be appreciated that the shortest possible length of straw is desired upon the grain heads after swathing and prior to threshing so that the volume of straw does not interfere with the threshing action of a combine. For example if the stubble is cut relatively short by the swather, then a relatively large volume of straw will have to be processed by the thresher or combine which interferes with efficient action of the concave and separation assemblies.

While it is appreciated that the cutter bar assemblies of swathers can be raised so that the straw length can be controlled, nevertheless it will also be appreciated that it is not desirable to leave relatively long straw stubble which although advantageous to fertility, nevertheless causes considerable problems by not supporting the windrow adequately.

Furthermore, relatively long straw stubble does not support a swath efficiently, because the weight of the swath forces the long stubble downwardly so that good air circulation is not possible. Another disadvantage of long straw stubble is the difficulty in picking-up the swath therefrom when threshing or combining due to buckling and flattening of the swath or windrow supporting stubble.

Known prior art includes U.S. Pat. No. 1,905,409 which shows a "trough swather" but without any conditioning of the stubble in the swath path and U.S. Pat. No. 2,850,681 which teaches a similar result. U.S. Pat. No. 1,944,750 illustrates a system which includes the laying of a mat of straw on the stubble in order to support the swath which is then subsequently laid on top of the mat.

Canadian Pat. No. 328,857 is also a "trough swather" giving a result similar to U.S. Pat. No. 1,905,409.

Canadian Pat. No. 321,071 shows a structure in which the rear edge of a stationary pan engages the tops of the stubble and deflects them over to receive the swath, the weight of which proposes to hold the ends in the bent position. However, this is problematical and certainly cannot be called conditioning of the stubble.

SUMMARY OF THE INVENTION

The present invention overcomes many of the disadvantages inherent with conventional harvesting methods by providing a stubble conditioning device which, under certain circumstances, shortens the stubble length to a predetermined amount and also batters or distorts the upper portion or upper ends of the stubble so that it acts as a good support for the swath thus allowing air to pass underneath and therethrough for the swath conditioning action.

Another advantage of the present invention is that the location of the stubble conditioning blades is such that the stubble being treated, can be "crowned" so that the swath deposited thereon is slightly higher in the center than at the sides not only assisting in good air circulation but reducing the possibility of the swath being lifted and scattered by high winds.

Another advantage of the present invention is to provide a device of the character herewithin described which can readily be attached to the existing swath discharge area of a swather whether the swather by a central delivery type or an end delivery type.

Still another advantage of the present invention is to provide a device which can be hingedly secured to the cutter bar assembly so that although the height of the cutter bar can be adjusted within limits, the rear of the swath conditioning device remains substantially the same height above the ground.

In accordance with one embodiment of the invention there is provided, in a swather which includes a frame, a transverse cutter bar assembly for cutting a swath, including a cutter bar support member, a canvas assembly, and a swath discharge area at one end of the canvas of said canvas assembly; the improvement comprising a stubble conditioning assembly below said swath discharge area for conditioning the tops of the stubble over which the swath is to be deposited, said stubble conditioning assembly including a substantially rectangular frame pivotally supported by the front side thereof to the frame of the swather and depending rearwardly and downwardly through the swath discharge area, gauge means on said rectangular frame for supporting the rear side thereof a predetermined distance from the ground, stubble conditioning means mounted in said rectangular frame upon the underside thereof, operatively connectable to a source of power, to operate same, and means overlying said rectangular frame to guide the swath rearwardly from said swath discharge area and deposits same upon the conditioned stubble therebehind.

In another embodiment of the invention there is provided a swath plate upon the upper side of the rectangular frame of the stubble conditioning assembly upon which the swath engages and slides downwardly upon the ground.

In a further embodiment of the invention there is provided a rearwardly extending endless conveyor with an upper run which moves rearwardly and receives the swath and moves it rearwardly to discharge same upon the stubble. The stubble conditioning assembly is pivotally secured below the rearwardly extending endless conveyor and inclines downwardly therefrom as it extends rearwardly therewith.

Another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a partially schematic end view of a conventional swather with the invention secured thereto.

FIG. 2 is a fragmentary top plan view of a swather showing the grain discharge area and the invention attached thereto.

FIG. 3 is a fragmentary partially broken away end view showing one method of mounting the source of power for the swath conditioning device.

FIG. 4 is a top plan view of the invention per se with the top plate removed showing the drive for the rotating blades.

FIG. 5 is an underside view of the device per se.

In the drawings like characters of reference indicate corresponding parts in the different figures.

DETAILED DESCRIPTION

Figure 6:
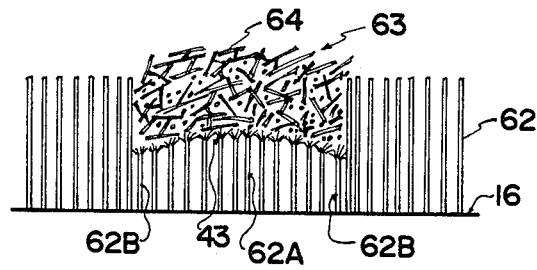
FIG. 6 is a schematic view showing the treated stubble with a swath supported thereby.

Proceeding therefore to describe the invention in detail, FIGS. 1 to 8 show one embodiment in which reference character 10 illustrates generally, a conventional swather having supporting framework 11, ground engaging support wheels 12, a reel assembly collectively designated 13, and a cutter bar assembly collectively designated 14.

Means are provided to adjust the relationship of the reel with the cutter bar assembly taking the form of hydraulic piston and cylinder assemblies 15 and means are provided (not illustrated) to adjust the height of the cutter bar assembly relative to the ground which is indicated by reference character 16.

Such swathers include canvas or augar delivery assemblies collectively designated 17 which may either provide a canvas discharge area 19 at either end thereof or, as it more common, a central delivery area 18 situated between the inner ends 19 of a pair of canvas assemblies, the upper rungs of which move towards one another as indicated by arrows 20, all of which is conventional.

The cutter bar assembly 14 includes an endwise reciprocal cutter blade 21 in conjunction with stationary cutters supported upon a transversely extending cutter support bar 22.

The invention collectively designated 23 is situated within the swath discharge area 18 and receives the swath therefrom and deposits it behind the swather which is travelling in the direction of arrow 24.

The stubble conditioning assembly 23 consists of a rectangular frame 25 including a front transverse member 26, a rear transverse member 27 and end members 28. An upper planar plate 29 spans the frame and the swath deposited from the canvases, is deposited upon this plate as will hereinafter be described.

The stubble conditioning device 23 is hingedly secured by means of a transverse hinge 30, to the cutter support bar 22 and within the swath discharge area 18 and extends rearwardly and downwardly through this swath discharge area and terminates rearwardly of the canvas conveyors 20. The rear end of the stubble conditioning device is supported upon the ground, in the present embodiment, by means of a pair of gauge wheels 31 journalled for rotation upon an axle 32 extending upon each side adjacent the rear end 27 and the diameter of these wheels 31 maintains the rear side 27 a predetermined amount above the ground 16.

The angle of inclination of the top plate 29 will vary within limits depending upon the height of the cutter bar assembly 14 but the rear side 27 will remain relatively constant thus gauging, within limits, the height of the stubble.

A base plate 33 also spans the frame 25 and supports, a plurality of blades collectively designated 34, upon spindles 35 with the cutter blades 34 being situated upon the underside of the lower plate 33.

If desired a sickle type cutter bar 34C, shown in phantom in FIG. 5, maybe used to shorten the stubble prior to fraying.

In the present embodiment, three such blades are provided, a front, centrally located blade 34A and a pair of spaced apart rearwardly situated blades 34B as clearly shown in FIG. 5.

Figure 7:
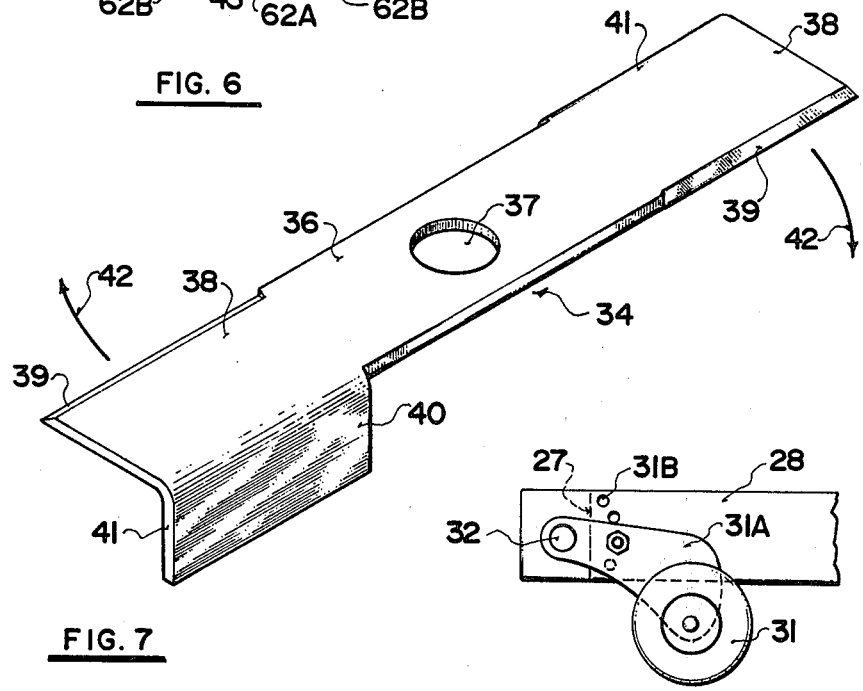
FIG. 7 is an isometric view of one of the cutter blades per se.

The preferred embodiment of each blade is shown in FIG. 7 and it will be observed that the blade is formed from a rectangular plate having a raised central portion 36 apertured as at 37 by which it is secured to the relevant spindle 35 in a conventional manner, this central portion 36 defines a pair of outer portions 38 each of which has a leading edge sharpened edge 39 acting as a cutting edge and a trailing stubble-top conditioning portion 40. This conditioning portion curves downwardly substantially at right angles to the plane of the portions 38 as clearly illustrated thus presenting a substantially vertical face 41 in the direction of rotation which is indicated by arrow 42.

In operation, the cutting edge severs the stubble at the predetermined height and the face 41 batters the upper end of the stubble thus splitting same or distorting or battering over these upper ends so that they present a supporting surface for the swath being deposited thereon.

This is illustrated by reference character 43 in FIG. 6.

Drive means are provided for the blades 34 connectable to a source of power 44 mounted upon a support platform 45 extending rearwardly from the supporting framework 11 of the swather. The source of power 44 may take the form of a small gasoline engine mounted upon a slide (not illustrated) adjustable by means of adjusting handle 45 for tightening or loosening the drive belt 47 in a conventional manner, said drive belt extending around the drive pulley 48 from the drive shaft of the motor. This belt also extends around a pulley 49 (see FIG. 4) which supplies power to a drive belt 50. This drive belt extends around a further pulley 51 upon shaft 52 to which the pulley 49 is secured and a pair of pulleys 53 situated at right angles to pulley 51, changes the direction of the belt in a known manner. This belt extends around an idler pulley 54 journalled for rotation upon the bottom plate 33 of the stubble conditioning device, around a further idler pulley 55 and around pulleys 56 and 57 which are secured to shafts 35 of the rear blade 34B. It then passes around a further idler pulley 58 and around pulley 59 secured to shaft 35 of the front blade 34A. The belt then extends around a further idler pulley 60 and back to the pulleys 53 thus causing rotation of the blades in the direction of arrows 61.

It is of importance to note the action of the blades 34A and 34B due to the rearwardly and downwardly inclining situation of the stubble conditioning device clearly illustrated in FIGS. 1 and 3. The angle of inclination causes the front blade 34A to cut and condition the stubble at a slightly higher level than the blades 34B.

Reference to FIG. 6 will show stubble 62 left by the cutter blade assembly 14 and the area indicated by reference character 63 indicates the stubble spanning the width of the swath delivery area 18 and having been treated by the stubble conditioning device prior to the swath being deposited thereon.

The aforementioned centrally located forward blade 34A leaves a central area of stubble indicated by reference character 62A which is slightly higher than the two side areas indicated by reference character 62B, left by the rear side blades 34B. It will also be noted that the average level of the stubble 62A and 62B is below the average level of the remaining stubble 62 so that a trough is formed immediately behind the swath discharge area 18 into which the swath shown schematically by reference character 64, is deposited.

Because of the difference in height of the central portion 62A relative to the side portions 62B, the swath is slightly crowned which assists in air circulation and that the swath in general, is situated in a position where the remaining stubble 62 tends to protect the swath 64 from being lifted by high winds.

Many advantages flow from the use of the present invention one of which is the greatly lowered amount of material other than grain (i.e. straw) resulting in much better straw walker efficiency.

Because of less straw, less concave and cylinder bar wear occurs giving an increase in the capacity of the combine. This also leads to fuel saving and less engine wear with better straw chopper efficiency with less power to operate same. Better sieve function also occurs with less wind needed with stick straws and white caps.

In the swathing operation, there is less straw in the swath due to the fact that a greater height of straw can now be left although not to the extent that it interferes with subsequent plowing or disking. The support given to the swath gives faster curing and drying out and wind protection with the swath being below the stubble line.

Also, it is noted that there is a higher air temperature below the stubble line with this type of protection given to the swath.

Figure 8:
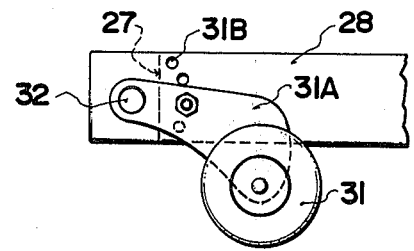
FIG. 8 is a fragmentary side elevation of one embodiment for mounting the gauge wheels for limited height adjustment.

Because the cutter bar is operated at a higher level than normal, less cutter bar damage occurs and automatic stubble height control and swath to ground height aspect is guaranteed by the gauge wheels which can be replaced by wheels of different diameters or can be adjusted in height by conventional means such as shown in FIG. 8 in which a wheel bracket 31A can be positioned in any one of a plurality of apertures 31B in the side frame member 28.

After harvesting, the longer stubble gives excellent moisture conservation by trapping more snow in winter months and of course better control of spring runoff also occurs.

Wind erosion protection is also facilitated and easier disking and incorporation of the standing stubble is provided because there is less loose straw than heretofore.

It should also be noted that a plurality of spaced and parallel wires or bars 65 extend rearwardly from the rear frame member 27 of the stubble conditioning frame which engage between the treated stubble thus depositing the swath gently upon the tops of the treated stubble rather than the swath being dropped into position which tends to force the swath downwardly between the stubble.

Figure 9:
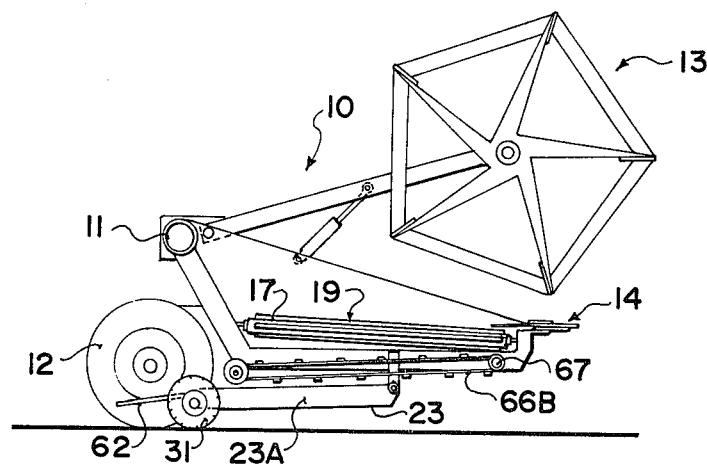
FIG. 9 is a view similar to FIG. 1 but showing an alternative embodiment.
Figure 10:
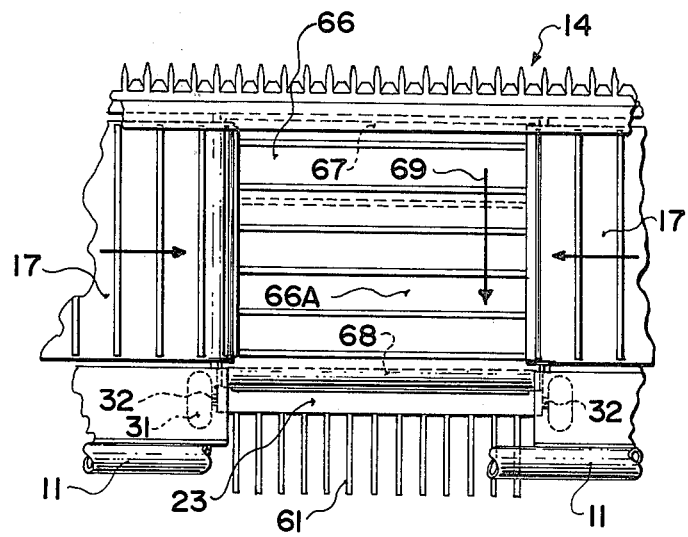
FIG. 10 is a view similar to FIG. 2 but showing the alternative embodiment of FIG. 9.

FIGS. 9 and 10 show structure somewhat similar to that previously described but structure which is particularly suited for use in the event that it is necessary to lower the cutter bar closer to the ground than normal, a condition which sometimes occurs when a crop is grown in very dry weather and, when ripen, is still relatively short in the stalk.

Under these conditions, an endless canvas conveyor 66 is situated within the swath discharge area of this swather between the two canvas conveyor 17 and which is mounted for rotation upon a front roller 67 and a rear roller 68 both of which are journalled for rotation upon the supporting frame members of the swather with conventional means being provided (not illustrated) to rotate the swather so that the upper run 66A, moves in the direction of arrow 69 thereby receiving the swath from the assemblies 17 and moving it rearwardly to discharge it upon the conditioned stubble.

The stubble conditioning assembly identified as 23A in FIGS. 9 and 10 is similar in construction and operation to the stubble conditioning device 23 with the exception that the upper planar plate 29 does not operate in a similar manner as hereinbefore described and in fact can be removed if necessary.

In this embodiment it is hinged to the fore and aft frame members 70 at a location approximately half way back from the cutter bar assembly 14 in a location underneath the lower run 66B of the endless conveyor 66. It extends rearwardly with the conveyor 66 and depends downwardly therefrom to be supported by the gauge wheels 31 and can be controlled as to the angle of inclination in a manner similar to that hereinbefore described. However the location and mounting of the assembly 66 in this embodiment, permits the knife assembly 14 to be lowered to a greater degree without interfering with the operation of the stubble conditioning assembly.

The upper run 66A of the endless conveyor 66 deposits the swath onto the fingers 65 of the conditioning device which in turn lowers it gently onto the conditioned stubble immediately behind the device 23.

It should also be observed that the rotation of the blades 34 causes a down draft because of the downturned rear portions 40 thus having the effect of spreading the battered or distorted upper ends of the cut stubble to provide a better support platform for the swath to be deposited thereon.

It will therefore be appreciated that the purpose of this machine is to place a faster drying, extremely well supported, more secure, wind resistant, windrow, and as well significantly reduce the amount of straw ingested by the combine resulting in outstanding changes in fuel consumption and combine longevity and wear factors; and more important, an extremely significant increase in threshing capacity. This machine also enables the windrower to field cut at a much higher elevation, than presently possible greatly reducing cutter bar damage and allowing the windrow to be placed at the proper height and configuration and for the first time, ensure a completely automatic, adjustable swath to ground height aspect ratio. These assemblies can be mounted either as accessories or as integrally incorporated units at the factory.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim is:

1. In a swather which includes a frame, a transverse cutter bar assembly for cutting a swath, including a cutter bar support member, a conveyor system, and a swath discharge area at one end of the conveyor system; the improvecomprising a stubble conditioning assembly below said swath discharge area for conditioning the tops of the stubble over which the swath is to be deposited, said stubble conditioning assembly including a substantially rectangular frame pivotally supported by the front side thereof to the swather frame and depending rearwardly and downwardly through the swath discharge area, gauge means on said rectangular frame for supporting the rear side thereof a predetermined distance from the ground, stubble conditioning means mounted in said rectangular frame upon the underside thereof, operatively connectable to a source of power, to operate same, means overlying said rectangular frame to guide the swath rearwardly from said swath discharge area and deposits the swath upon the conditioned stubble therebehind.

2. The invention according to claim 1 which includes a plurality of swath guiding fingers in spaced and parallel relationship, extending rearwardly from the rear side of said rectangular frame.

3. The invention according to claim 1 in which said gauge means takes the form of a pair of ground engaging wheels each journalled for rotation one adjacent each side of the rear side of the said rectangular frame.

4. The invention according to claim 2 in which said gauge means takes the form of a pair of ground engaging wheels each journalled for rotation one adjacent each side of the rear side of the said rectangular frame.

5. The invention according to claim 1 in which said stubble conditioning means comprises at least one stubble conditioning blade journalled for rotation in a plane substantially parallel to the rectangular frame of said stubble conditioning assembly.

6. The invention according to claim 2 in which said stubble conditioning means comprises at least one stubble conditioning blade journalled for rotation in a plane substantially parallel to the rectangular frame of said stubble conditioning assembly.

7. The invention according to claim 3 in which said stubble conditioning means comprises at least one stubble conditioning blade journalled for rotation in a plane substantially parallel to the rectangular frame of said stubble conditioning assembly.

8. The invention according to claim 4 in which said stubble conditioning means comprises at least one stubble conditioning blade journalled for rotation in a plane substantially parallel to the rectangular frame of said stubble conditioning assembly.

9. The invention according to claim 5 which includes a pair of stubble conditioning blades situated in spaced apart relationship towards the rear side of said rectangular frame and a third stubble conditioning blade situated centrally between said pair of stubble conditioning blades and forwardly thereof towards the front side of said rectangular frame.

10. The invention according to claim 6 which includes a pair of stubble conditioning blades situated in spaced apart relationship towards the rear side of said rectangular frame and a third stubble conditioning blade situated centrally between said pair of stubble conditioning blades and forwardly thereof towards the front side of said rectangular frame.

11. The invention according to claim 7 which includes a pair of stubble conditioning blades situated in spaced apart relationship towards the rear side of said rectangular frame and a third stubble conditioning blade situated centrally between said pair of stubble conditioning blades and forwardly thereof towards the front side of said rectangular frame.

12. The invention according to claim 8 which includes a pair of stubble conditioning blades situated in spaced apart relationship towards the rear side of said rectangular frame and a third stubble conditioning blade situated centrally between said pair of stubble conditioning blades and forwardly thereof towards the front side of said rectangular frame.

13. The invention according to claim 7 in which each of said blades is mounted for rotation centrally thereof, thereby defining a pair of substantially horizontal planar outer portions, each outer portion having a leading cutting edge and a trailing stubble-top conditioner portion, said stubble-top conditioner portion curving downwardly from the plane of said cutter portions substantially at right angles to said plane whereby said cutting edge severs the stubble and said conditioner portion batters the upper ends of said cut stubble.

14. The invention according to claim 8 in which each of said blades is mounted for rotation centrally thereof, thereby defining a pair of substantially horizontal planar outer portions, each outer portion having a leading cutting edge and a trailing stubble-top conditioner portion, said stubble-top conditioner portion curving downwardly from the plane of said cutter portions substantially at right angles to said plane whereby said cutting edge severs the stubble and said conditioner portion batters the upper ends of said cut stubble.

15. The invention according to claim 9 in which each of said blades is mounted for rotation centrally thereof, thereby defining a pair of substantially horizontal planar outer portions, each outer portion having a leading cutting edge and a trailing stubble-top conditioner portion, said stubble-top conditioner portion curving downwardly from the plane of said cutter portions substantially at right angles to said plane whereby said cutting edge severs the stubble and said conditioner portion batters the upper ends of said cut stubble.

16. The invention according to claim 10 in which each of said blades is mounted for rotation centrally thereof, thereby defining a pair of substantially horizontal planar outer portions, each outer portion having a leading cutting edge and a trailing stubble-top conditioner portion, said stubble-top conditioner portion curving downwardly from the plane of said cutter portions substantially at right angles to said plane whereby said cutting edge severs the stubble and said conditioner portion batters the upper ends of said cut stubble.

17. The invention according to claims 14, 15 or 16 in which said means overlying said rectangular frame includes a swather plate upon the upper side of said rectangular frame.

18. The invention according to claims 14, 15 or 16 in which said means overlying said rectangular frame includes an endless conveyor operatively mounted within the swath discharge area whereby the upper run receives the swath from the conveyor system of the swather and moves same rearwardly, said stubble conditioning assembly being situated below said endless conveyor and extending rearwardly therewith but inclining downwardly therefrom.

19. The invention according to claim 5, in which each of said blades is mounted for rotation centrally thereof, thereby defining a pair of substantially horizontal planar outer portions, each outer portion having a leading cutting edge and a trailing stubble-top conditioner portion, said stubble-top conditioner portion curving downwardly from the plane of said cutter portions substantially at right angles to said plane whereby said cutting edge severs the stubble and said conditioner portion batters the upper ends of said cut stubble.

20. The invention according to claim 6 in which each of said blades is mounted for rotation centrally thereof, thereby defining a pair of substantially horizontal planar outer portions, each outer portion having a leading cutting edge and a trailing stubble-top conditioner portion, said stubble-top conditioner portion curving downwardly from the plane of said cutter portions substantially at right angles to said plane whereby said cutting edge severs the stubble and said conditioner portion batters the upper ends of said cut stubble.

21. The invention according to claims 1, 2 or 3 in which said means overlying said rectangular frame includes a swather plate upon the upper side of said rectangular frame.

22. The invention according to claims 4, 5 or 6 in which said means overlying said rectangular frame includes a swather plate upon the upper side of said rectangular frame.

23. The invention according to claims 7, 8 or 9 in which said means overlying said rectangular frame includes a swather plate upon the upper side of said rectangular frame.

24. The invention according to claims 10, 11 or 12 in which said means overlying said rectangular frame includes a swather plate upon the upper side of said rectangular frame.

25. The invention according to claims 19, 20 or 13 in which said means overlying said rectangular frame includes a swather plate upon the upper side of said rectangular frame.

26. The invention according to claims 1, 2 or 3 in which said means overlying said rectangular frame includes an endless conveyor operatively mounted within the swath discharge area whereby the upper run receives the swath from the conveyor system of the swather and moves same rearwardly, said stubble conditioning assembly being situated below said endless conveyor and extending rearwardly therewith but inclining downwardly therefrom.

27. The invention according to claims 4, 5 or 6 in which said means overlying said rectangular frame includes an endless conveyor operatively mounted within the swath discharge area whereby the upper run receives the swath from the conveyor system of the swather and moves same rearwardly, said stubble conditioning assembly being situated below said endless conveyor and extending rearwardly therewith but inclining downwardly therefrom.

28. The invention according to claims 7, 8 or 9 in which said means overlying said rectangular frame includes an endless conveyor operatively mounted within the swath discharge area whereby the upper run receives the swath from the conveyor system of the swather and moves same rearwardly, said stubble conditioning assembly being situated below said endless conveyor and extending rearwardly therewith but inclining downwardly therefrom.

29. The invention according to claims 10, 11 or 12 in which said means overlying said rectangular frame includes an endless conveyor operatively mounted within the swath discharge area whereby the upper run receives the swath from the conveyor system of the swather and moves same rearwardly, said stubble conditioning assembly being situated below said endless conveyor and extending rearwardly therewith but inclining downwardly therefrom.

30. The invention according to claims 19, 14 or 13 which said means overlying said rectangular frame includes an endless conveyor operatively mounted within the swath discharge area whereby the upper run receives the swath from the conveyor system of the swather and moves same rearwardly, said stubble conditioning assembly being situated below said endless conveyor and extending rearwardly therewith but inclining downwardly therefrom.

* * * * *